Aug. 25, 1931.  E. SAUVAGEAU  1,820,835
POULTRY FOUNTAIN
Filed June 10, 1929
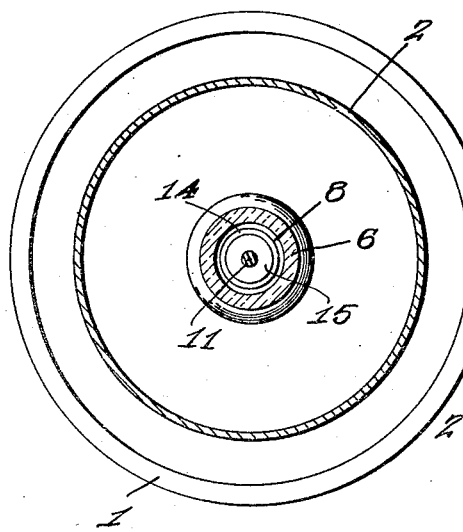
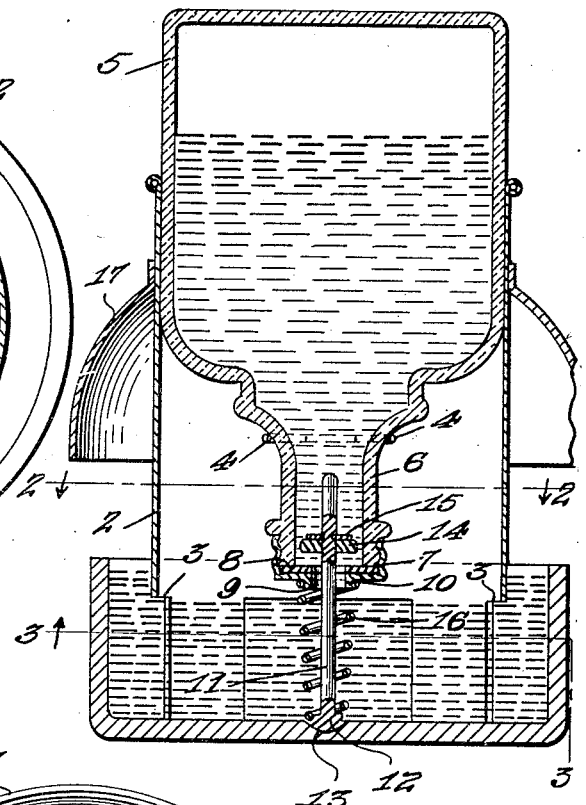
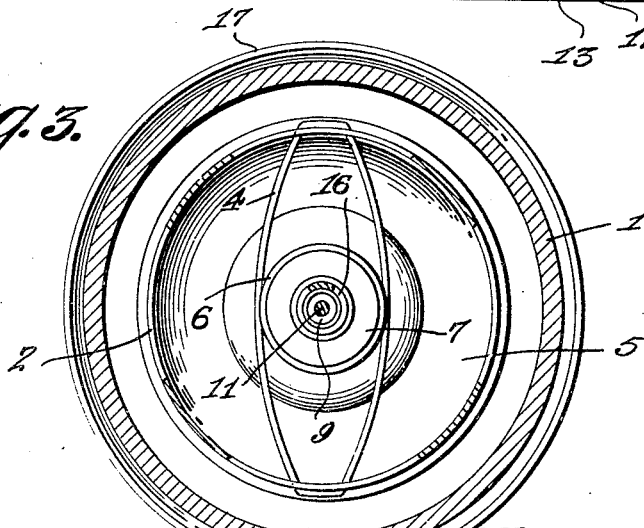
Emile Sauvageau, INVENTOR
BY Victor J. Evans ATTORNEY Patented Aug. 25, 1931

1,820,835

UNITED STATES PATENT OFFICE

EMILE SAUVAGEAU, OF SOUTH PEABODY, MASSACHUSETTS

POULTRY FOUNTAIN

Application filed June 10, 1929. Serial No. 369,795.

My present invention has reference to a poultry watering fountain, and my primary object is the provision of a device for this purpose in which the pan or bottom of the fount has arranged therein and disposed in close proximity to the inner periphery thereof a cylindrical member which is notched and open at the bottom portion, the said cylindrical member providing a guide for the body of of a water containing bottle which has screwed on the mouth thereof a cap that has extending through a central opening therein the stem for a valve, the said stem being spring influenced in an outward direction whereby the valve will normally close the opening in the cap, but the stem is of such length that the same will be moved to unseat the valve when the outer end of the spring rests on the bottom of the pan or fount and whereby water will be continuously delivered into the fount, the cylindrical member serving as a protector for preventing chicks or fowls placing their feet or body portions in the fount and thus muddying the water therein with the result that the water is retained in a clean condition and the fount is constantly supplied as long as water remains in the water container, the latter being readily removable for refilling and when the cap carrying valve is again arranged on the mouth of the said container the same will be sealed until again reinserted in the cylindrical protector, the device being also of a construction whereby the level of water in the pan or fount is at all times visible.

To the attainment of the foregoing the invention consists in the improvement hereinafter described and definitely claimed.

In the drawings:

Figure 1 is an approximately central vertical longitudinal sectional view through the improvement.

Figure 2 is a horizontal sectional view approximately on the line 2—2 of Figure 1.

Figure 3 is a similar sectional view approximately on the line 3—3 of Figure 1.

As disclosed by the drawings I employ a cylindrical flanged and preferably earthenware drinking fount or pan 1. I arrange in this fount a cylindrical protector 2. The cylinder 2 is of a materially greater length than the depth of the fount and has both of its ends open. The lower end of the protector, at points below the top of the pan or fount 1, is cut away to provide the same with notches or openings 3. The protector is provided at determined points throughout its length with spring wire braces arranged in oppositely arched pairs, only one of such braces being illustrated by the drawings and the same being indicated by the numeral 4.

The water container may be in the nature of an ordinary bottle, as disclosed by the drawings and as indicated by the numeral 5. The container, however, is designed to be snugly received against the walls at the upper and open end of the protector 2. The container is provided with a neck portion 6 and screwed on this neck to close the mouth of the container there is a flanged cap 7. A suitable washer 8 is arranged on the inner face of the cap 7 and the said cap is formed with a central opening 9, which, in the showing of the drawings is surrounded by an annular flange 10.

A rod, comprising a valve stem 11 passes through the opening 9, the outer end of the rod being headed, as at 12, and if desired the inner face of the bottom wall of the pan or fount 1 may be formed with a recess 13 to receive the conical head 12 of the valve stem therein. The valve stem carries a compressible valve 14 which is held thereon by means 15, the said valve being arranged in the neck of the water container. A coil spring 16 surrounds the outer portion of the valve and has one of its ends seated around the flange 10 of the cap 7 and its other end contacted with the head 12 of the valve stem.

The neck is received between the spring brace supports 4 which more effectively sustain the container in the cylindrical protector 2.

The container when removed will have the valve 14 automatically close the opening 9 in the cap 7 so that dirt or foreign matter cannot enter the container. The cap, together with the valve is removed when the contained is filled with water. The container may be conveyed with its mouth closed for any desired distance or for any desired length of time and unless pressure is exerted upon the head 12 of the valve stem 11 the mouth of the container will remain sealed. The container when inverted and first arranged in the protector cylinder 2 has its mouth still remaining closed by the valve 14 until the head 12 of the valve stem contacts with the bottom of the pan or fount 1, which, of course, will exert a pressure on the stem against the tension of the spring 16 and unseat the valve 14. Water from the container will then flow through the notches or openings in the cylindrical protector 2 into the fount or pan 1. As the protector is disposed in close proximity to the inner periphery of the flanged pan or fount 1 the fowls are permitted to only place their bills in the fount when drinking so that the water in the fount cannot be contaminated by dirt of the feet of the fowls. The water level in the fount is at all times visible and the simplicity of the construction and the advantages thereof will, it is thought, be apparent to those skilled in the art without further detailed description. It is, however, thought necessary to add that I do not wish to be restricted to the precise details herein set forth and, therefore, hold myself entitled to make such changes therefrom as fairly fall within the scope of what I claim.

In order to protect the water in the pan 1 from the entrance of dirt or the like I preferably removably and adjustably secure to the cylinder 2 a metal canopy 17 of a size to extend a suitable distance beyond the periphery of the said pan 1. The canopy also protects the water in the pan 1 from heat from the sun rays and consequently retains the said water in a cooler condition than is ordinary.

Having described the invention, I claim:

A poultry fountain including a fluid supply bottle having a reduced screw threaded neck, and a drinking fount including bottom and side walls, a cylindrical member resting on the bottom wall and spaced from the side wall and projecting above the latter to receive the bottle in an inverted position, arched pairs of spring members carried by the member and receiving the neck of the bottle, a cap threaded to the neck and having an opening to supply fluid to the fount within the cylindrical member, a stem extending through the opening, a valve on said stem for closing the opening and opened by the stem engaging the bottom wall of the fount, a head on the stem, a spring between the head and the neck to close the valve when the stem is disengaged from the bottom wall, said cylindrical member having openings arranged below the upper edge of the side wall to permit the fluid within the cylindrical member to pass into the space between the latter and the side wall of the fount, and a hood secured to the cylindrical member and disposed over and spaced from the upper edge of the fount.

In testimony whereof I affix my signature.

EMILE SAUVAGEAU.